(12) United States Patent
Okano et al.

(10) Patent No.: US 6,449,074 B1
(45) Date of Patent: *Sep. 10, 2002

(54) OPTICAL TRANSMISSION DEVICE AND OPTICAL COMMUNICATION SYSTEM

(75) Inventors: Satoru Okano; Hiroshi Nishimoto; Kazuo Yamane; Takashi Tsuda; Yumiko Kawasaki, all of Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/039,567

(22) Filed: Mar. 16, 1998

(30) Foreign Application Priority Data

Oct. 17, 1997 (JP) .............................. 9-285097

(51) Int. Cl.[7] .................................. H04J 14/02
(52) U.S. Cl. ................... 359/133; 359/110; 359/134
(58) Field of Search ................. 359/124, 110, 359/134, 161, 160, 133

(56) References Cited

U.S. PATENT DOCUMENTS 5,920,414 A * 7/1999 Miyachi et al. .............. 359/133
6,081,359 A * 6/2000 Takehana et al. ........... 359/133

\* cited by examiner

*Primary Examiner*—Kinfe-Michael Negash
(74) *Attorney, Agent, or Firm*—Staas & Halsey LLP

(57) ABSTRACT

The present invention relates to an optical transmission device and an optical communication system applied to wavelength division multiplexing (WDM). The optical transmission device includes an optical multiplexer for wavelength division multiplexing a plurality of optical signals to generate WDM signal light and outputting the WDM signal light to an optical transmission line, a detecting unit for detecting a break of each optical signal according to the power of each optical signal, and a compensator for adding light having a predetermined wavelength to the WDM signal light when at least one of the optical signals is cut off. Through the structure of the present invention it becomes possible to prevent a deterioration in transmission quality in the case that the number of WDM channels is changed.

22 Claims, 14 Drawing Sheets

OPTICAL TRANSMISSION DEVICE AND OPTICAL COMMUNICATION SYSTEM

BACKGROUND OF THE INVENTION

1. Field of the Invention

The present invention relates generally to wavelength division multiplexing (WDM) using a plurality of optical signals having different wavelengths, and more particularly to an optical transmission device and an optical communication system applied to WDM.

2. Description of the Related Art

In recent years, a manufacturing technique and using technique for a low-loss (e.g., 0.2 dB/km) optical fiber have been established, and an optical communication system using the optical fiber as a transmission line has been put to practical use. Further, to compensate for losses in the optical fiber and thereby allow long-haul transmission, an optical amplifier for amplifying signal light has been put to practical use.

An optical amplifier known in the art comprises an optical amplifying medium to which signal light to be amplified is supplied and means for pumping (exciting) the optical amplifying medium so that the optical amplifying medium provides a gain band including the wavelength of the signal light. For example, an erbium doped fiber amplifier (EDFA) comprises an erbium doped fiber (EDF) as the optical amplifying medium and a pumping source for supplying pump light having a predetermined wavelength to the EDF. By preliminarily setting the wavelength of the pump light within a 0.98 $\mu$m band (0.97 $\mu$m to 0.99 $\mu$m) or a 1.48 $\mu$m band (1.47 $\mu$m to 1.49 $\mu$m), a gain band including a wavelength of 1.55 $\mu$m can be obtained. Further, another type optical amplifier having a semiconductor chip as the optical amplifying medium is also known. In this case, the pumping is performed by injecting an electric current into the semiconductor chip.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. On the receiving side, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

Accordingly, by combining an optical amplifier and WDM, the span and capacity of an optical communication system can be increased.

In the case of combining an optical amplifier and WDM, there is a possibility that a transmission quality may be deteriorated by automatic output level control (ALC) performed in the optical amplifier. In general, ALC is control such that a total output level of an optical amplifier is maintained constant. Accordingly, when an optical signal in a certain one of WDM channels is cut off, for example, an optical output level in each of the other channels increases to cause a possibility that the transmission quality may be influenced by nonlinear effects (SPM: Self-Phase Modulation, XPM: Cross-Phase Modulation, FWM: Four-Wave Mixing, etc.) occurring in an optical fiber transmission line. It is known that the influence of nonlinear effects is remarkable particularly in the case of high-speed transmission at 10 Gb/s or higher.

SUMMARY OF THE INVENTION

It is therefore an object of the present invention to provide an optical transmission device and an optical communication system which can eliminate the possibility of deterioration in transmission quality in the case that the number of WDM channels is changed.

Other objects of the present invention will become apparent from the following description.

In accordance with an aspect of the present invention, there is provided an optical transmission device comprising an optical multiplexer for wavelength division multiplexing a plurality of optical signals to generate WDM signal light and outputting the WDM signal light to an optical transmission line; means for detecting a break of each of the plurality of optical signals according to the power of each optical signal; and compensating means for adding light having a predetermined wavelength to the WDM signal light when at least one of the plurality of optical signals is cut off.

With this configuration, when at least one of the WDM channels is cut off, the light having the predetermined wavelength is added to the WDM signal light. Accordingly, in the case of carrying out ALC (automatic output level control) for maintaining constant a total output level of an optical amplifier for amplifying the WDM signal light, for example, a change in optical output level per channel can be suppressed, thereby achieving one of the objects of the present invention.

In accordance with another aspect of the present invention, there is provided an optical transmission device comprising a plurality of optical senders for outputting a plurality of optical signals having different wavelengths; an optical multiplexer for wavelength division multiplexing the plurality of optical signals to generate WDM signal light and outputting said WDM signal light to an optical transmission line; and at least one light source for adding light having a predetermined wavelength to the WDM signal light.

In the case that ALC for maintaining a total output level constant is carried out in an optical amplifier, the range of variation in optical output level per channel is dependent on the number of channels. For example, when the number of channels decreases from 2 to 1, an optical output level of 3 dB is increased. In contrast therewith, when the number of channels decreases from 8 to 7, a change in optical output level is as small as 0.58 dB. Accordingly, by adding the light having the predetermined wavelength to the WDM signal light according to the present invention, the range of variation in optical output level in each of the remaining channels can be suppressed in the case that an optical signal in a certain one of the WDM channels is cut off.

In accordance with a further aspect of the present invention, there is provided an optical communication system. This system includes a terminal station apparatus for transmission and an optical fiber transmission line operatively connected to the terminal station apparatus. The terminal station apparatus includes the optical transmission device according to the present invention.

In this specification, the wording that an element and another element are operatively connected includes the case that these elements are directly connected, and also includes the case that these elements are so provided as to be related with each other to such an extent that an electrical signal or an optical signal can be mutually transferred between these elements.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1:
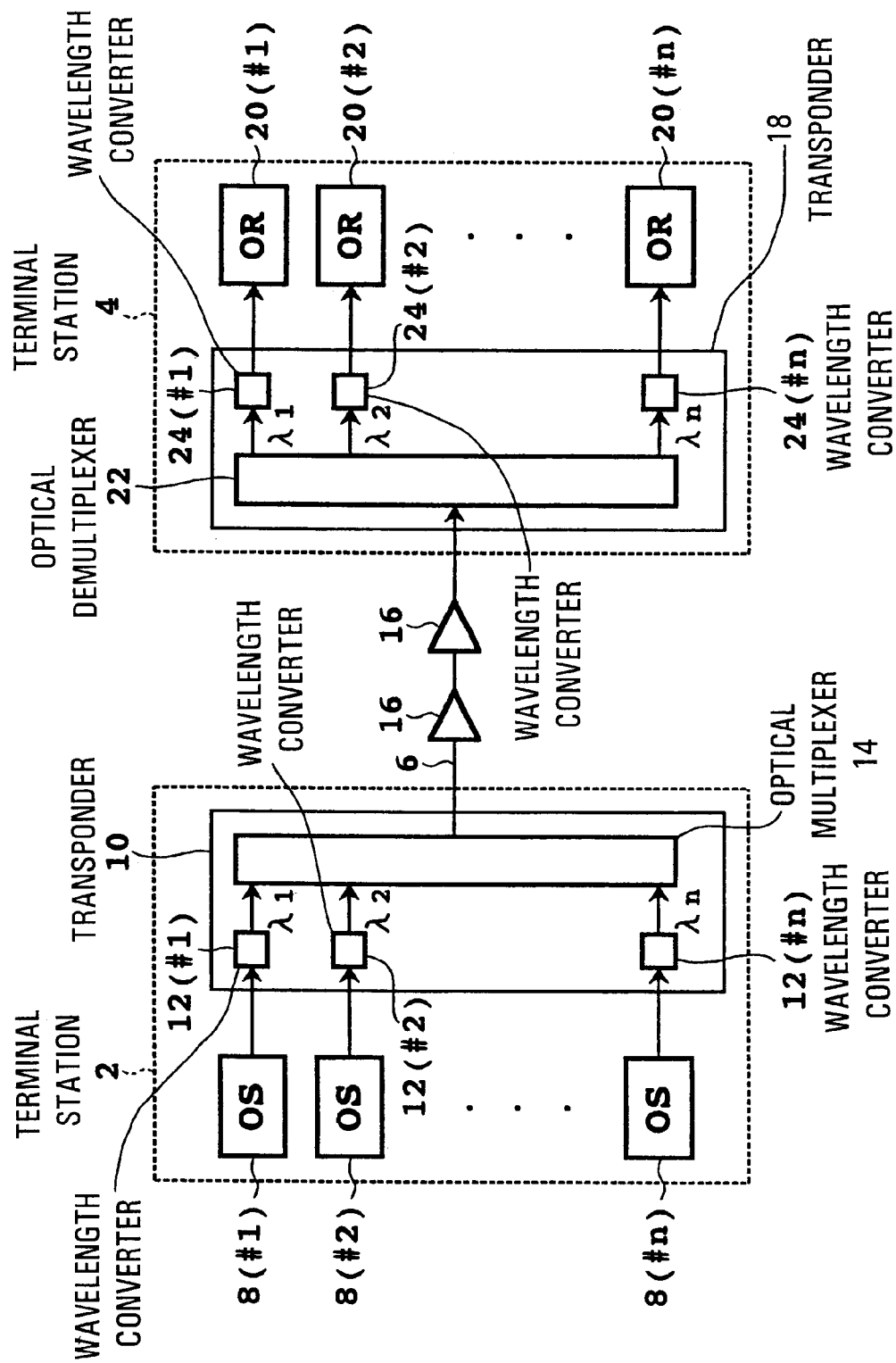
FIG. 1 is a block diagram of an optical communication system to which the present invention is applicable.

FIG. 1 is a block diagram of an optical communication system to which the present invention is applicable. This system includes a first terminal station 2 for transmitting, a second terminal station 4 for receiving, and an optical fiber transmission line 6 for connecting the terminal stations 2 and 4. The optical transmission device according to the present invention is applicable particularly to the first terminal station 2.

The first terminal station 2 has a plurality of optical senders (OS) 8 (#1 to #n) for outputting optical signals (original optical signals) having arbitrary wavelengths, and a transponder 10 operatively connected to the optical senders 8 (#1 to #n) and the optical fiber transmission line 6. The transponder 10 includes a plurality of wavelength converters 12 (#1 to #n) for wavelength converting the optical signals having arbitrary wavelengths from the optical senders 8 (#1 to #n) into optical signals having predetermined wavelengths $\lambda_1$ to $\lambda_n$, respectively, and an optical multiplexer 14 for wavelength division multiplexing the optical signals from the wavelength converters 12 (#1 to #n) to generate WDM signal light. The WDM signal light from the optical multiplexer 14 is output to the optical fiber transmission line 6.

A plurality of in-line optical amplifiers 16 are provided in the optical fiber transmission line 6. Each optical amplifier 16 amplifies the WDM signal light. That is, each optical amplifier 16 provides a gain band including the wavelengths of the WDM signal light. Depending on the length of the optical fiber transmission line 6, a single optical amplifier may be used.

The second terminal station 4 has a transponder 18 for separating the WDM signal light transmitted by the optical fiber transmission line 6 into individual optical signals (original optical signals) having arbitrary wavelengths, and a plurality of optical receivers (OR) 20 (#1 to #n) for receiving these optical signals, respectively. The transponder 18 includes an optical demultiplexer 22 for separating the input WDM signal light into a plurality of optical signals having wavelengths $\lambda_1$ to $\lambda_n$, and a plurality of wavelength converters 24 (#1 to #n) for wavelength converting these optical signals into optical signals having arbitrary wavelengths.

According to the configuration shown in FIG. 1, a transmission capacity can be increased according to the number of wavelengths because wavelength division multiplexing is applied. Further, the span of the optical fiber transmission line 6 can be increased with a simple configuration because the in-line optical amplifiers 16 are provided in the optical fiber transmission line 6. In particular, the wavelengths of the optical signals on the input side of the transponder 10 are arbitrary in the first terminal station 2, and the wavelengths of the optical signals on the output side of the transponder 18 are arbitrary in the second terminal station 4. Accordingly, existing devices may be used both as the optical senders 8 (#1 to #n) and as the optical receivers 20 (#1 to #n).

An extended optical network system using a regenerative repeater instead of each of the optical senders 8 (#1 to #n) or the optical receivers 20 (#1 to #n) may be provided.

Figure 2:
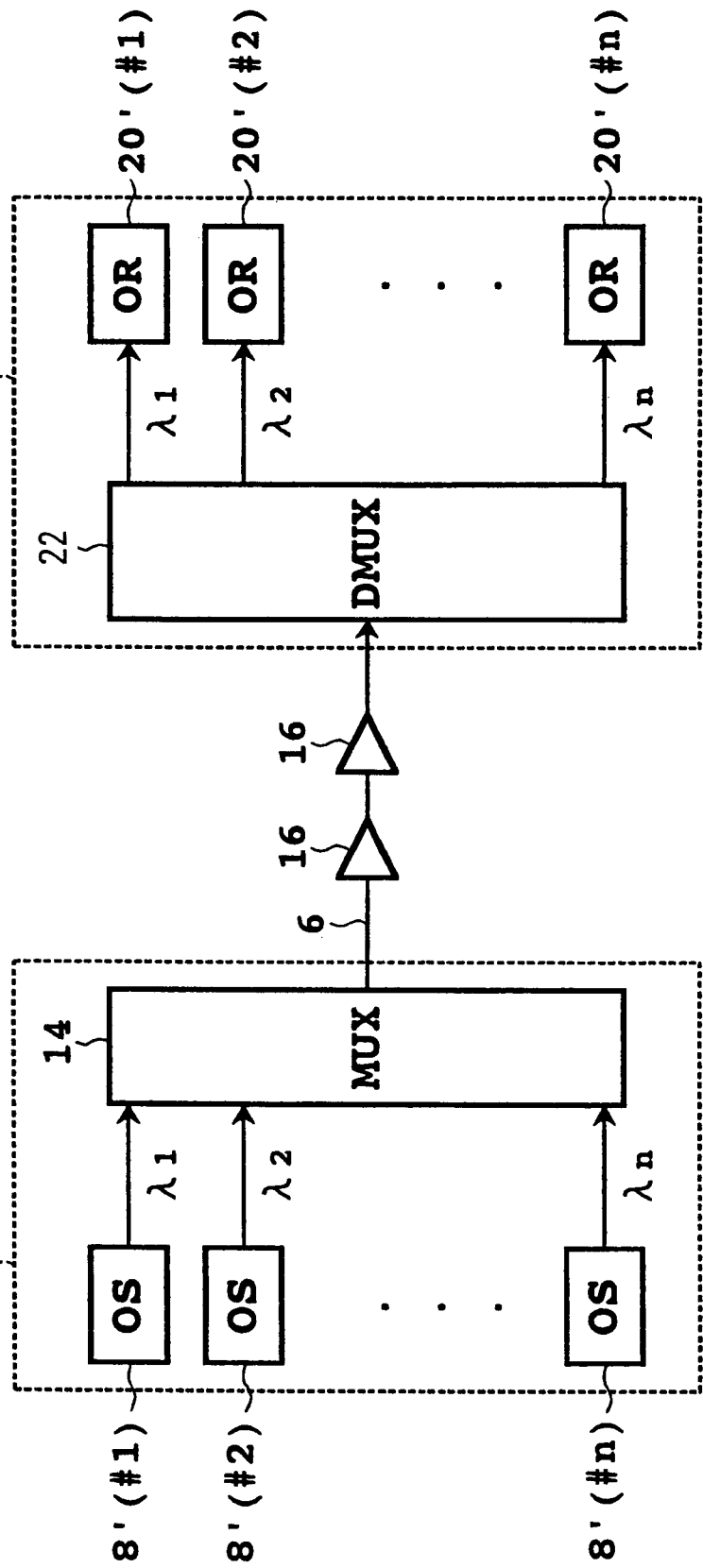
FIG. 2 is a block diagram of another optical communication system to which the present invention is applicable.

FIG. 2 is a block diagram of another optical communication system to which the present invention is applicable. In this system, a first terminal station 2' for transmission has a plurality of optical senders 8' (#1 to #n) for outputting optical signals having predetermined wavelengths $\lambda_1$ to $\lambda_n$ for wavelength division multiplexing, respectively. These optical signals are wavelength division multiplexed by an optical multiplexer (MUX) 14, and resultant WDM signal light is output to an optical fiber transmission line 6. In a second terminal station 4', the WDM signal light transmitted by the optical fiber transmission line 6 is separated into individual optical signals having wavelengths $\lambda_1$ to $\lambda_n$ by an optical demultiplexer (DMUX) 22, and these optical signals are supplied to a plurality of optical receivers 20' (#1 to #n), respectively.

According also to the system configuration shown in FIG. 2, an increase in transmission capacity and an increase in span of the optical fiber transmission line 6 can be achieved like the configuration shown in FIG. 1. Particularly in the system configuration of FIG. 2, the optical senders 8' (#1 to #n) and the optical receivers 20' (#1 to #n) are limited to devices dedicated for wavelength division multiplexing. However, it is possible to provide a system with a simpler configuration at a lower cost because any wavelength converters as shown in FIG. 1 are not required.

In each of the systems shown in FIGS. 1 and 2, another optical amplifier as a postamplifier may be provided between the optical multiplexer 14 and the optical fiber transmission line 6. Furthermore, another optical amplifier as a preamplifier may be provided between the optical fiber transmission line 6 and the optical demultiplexer 18.

Figure 3:
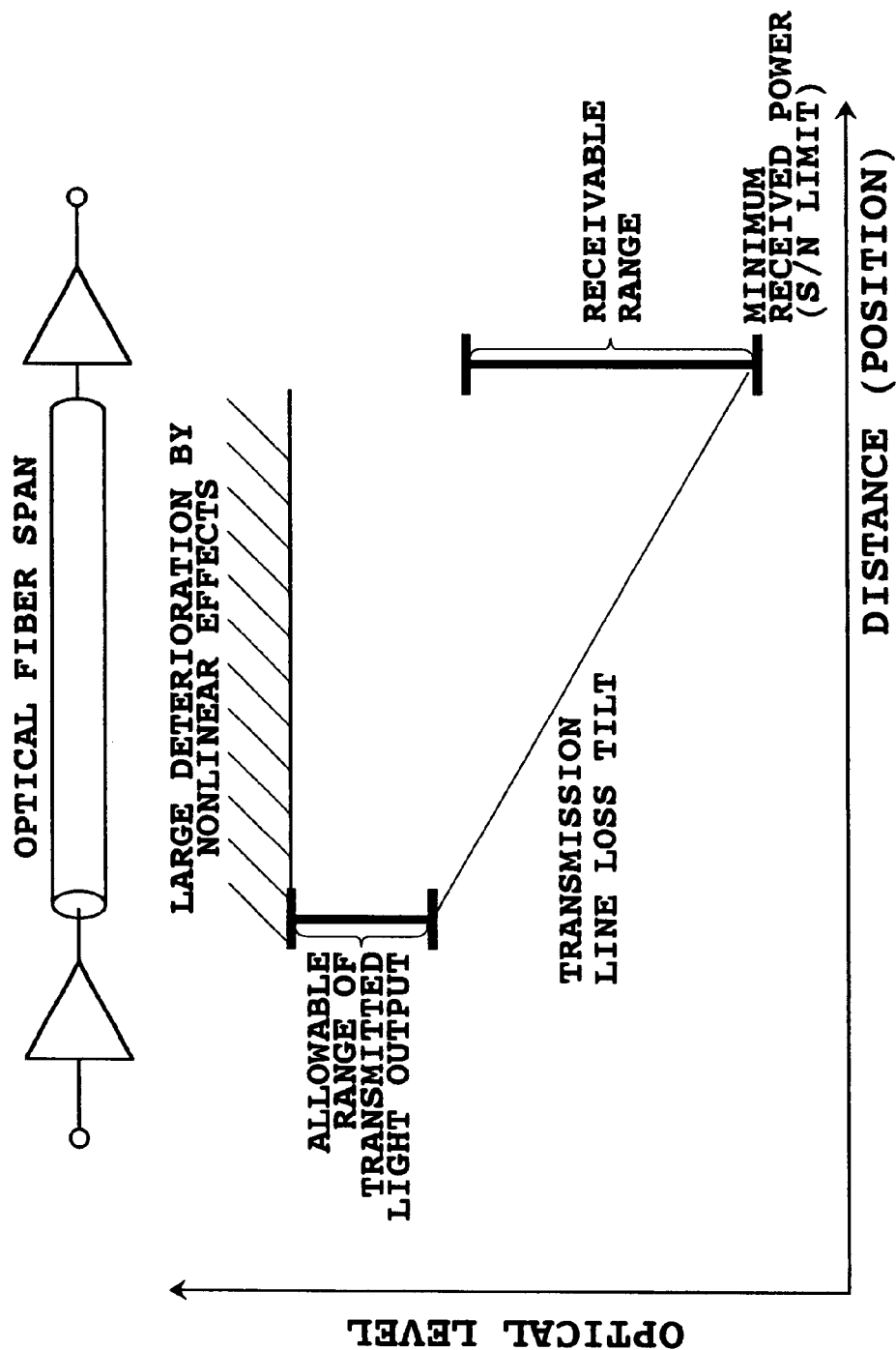
FIG. 3 is a power diagram for illustrating an allowable range of transmitted light output.

FIG. 3 is a power diagram for illustrating an allowable range of transmitted light output. In FIG. 3, the vertical axis represents optical level (optical power), and the horizontal axis represents distance (or position). The allowable range of transmitted light output at the input of an optical fiber span between two optical amplifiers is determined by a minimum received power (S/N limit) at the receiving optical amplifier and nonlinear effects in the optical fiber span. More specifically, the lower limit of the allowable range of transmitted light output is determined by a minimum received power and transmission line loss tilt, and the upper limit of the allowable range is determined by nonlinear effects. Further, the lower limit of a receivable range at the receiving optical amplifier is given by the minimum received power, and the upper limit of the receivable range is determined by the immunity of a photodetector such as a photodiode.

Accordingly, in the case that wavelength division multiplexing is applied in the system as shown in FIG. 1 or 2, it is important to make the optical levels of the optical signals in all the channels fall within the allowable range of transmitted light output in each optical amplifier for the purpose of maintaining a good transmission quality.

Figure 4:
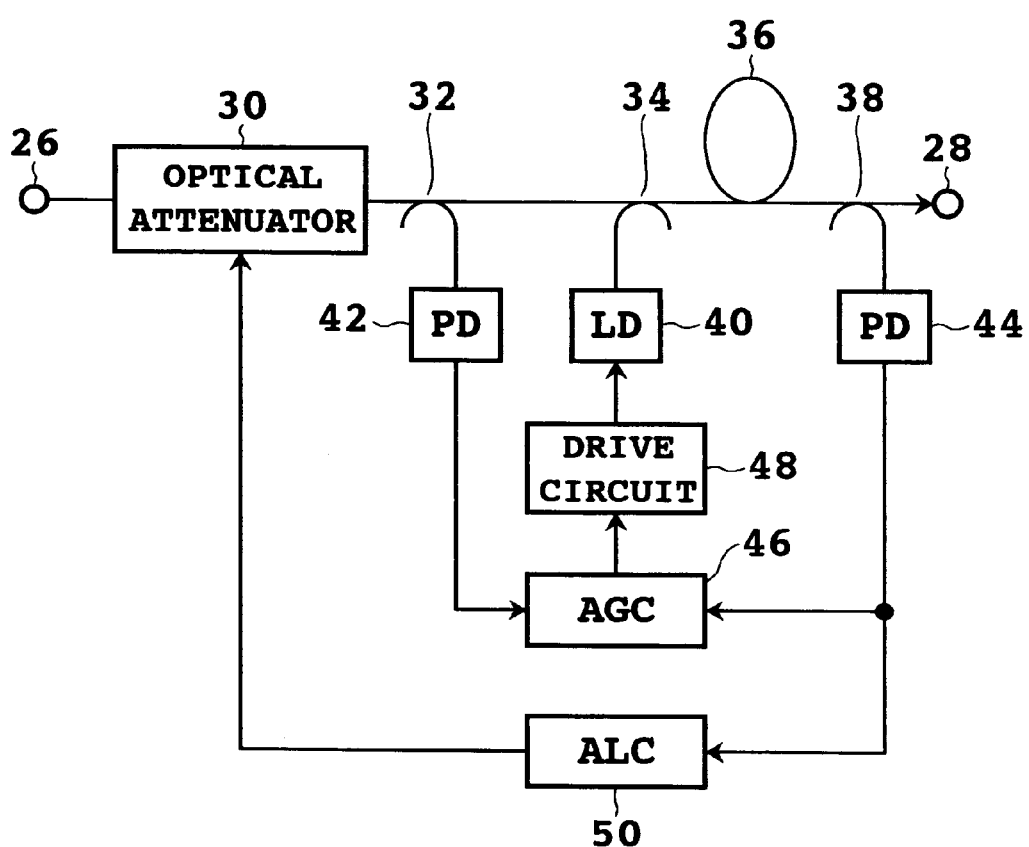
FIG. 4 is a block diagram of an optical amplifier applicable to the present invention.

FIG. 4 is a block diagram of an optical amplifier applicable to the present invention. The optical amplifier includes an optical attenuator 30 having a variable attenuation, an optical coupler 32, a WDM coupler 34, an erbium doped fiber (EDF) 36, and an optical coupler 38 provided in this order in terms of a propagation direction of WDM signal light between an input port 26 and an output port 28. The WDM signal light supplied to the input port 26 undergoes controlled attenuation by the optical attenuator 30 and is supplied through the optical coupler 32 and the WDM coupler 34 to the EDF 36. Pump light from a laser diode (LD) 40 as a pumping source is supplied through the WDM coupler 34 to the EDF 36. When the WDM signal light is supplied to the EDF 36 being pumped by the pump light, the WDM signal light is amplified in accordance with the principle of stimulated emission, and the WDM signal light amplified is passed through the optical coupler 38 and output from the output port 38.

In this optical amplifier, automatic gain control (AGC) is adopted to maintain a gain characteristic (wavelength dependence of gain) in the EDF 36 constant, and automatic output level control (ALC) is adopted to maintain a total output level constant.

The WDM signal light to be supplied to the EDF 36 and amplified therein is branched by the optical coupler 32, and resultant branch light is converted into an electrical signal according to the optical power by a photodetector (PD) 42 such as a photodiode. Further, the amplified WDM signal light is branched by the optical coupler 38, and resultant branch light is converted into an electrical signal according to the optical power by a photodetector 44. Output signals from the photodetectors 42 and 44 are supplied to an AGC circuit 46. The AGC circuit 46 controls a drive current to be supplied from a drive circuit 48 to the laser diode 40 so that the gain of the EDF 36 becomes constant. The output signal from the photodetector 44 is supplied also to an ALC circuit 50. The ALC circuit 50 controls the attenuation of the optical attenuator 30 so that the total output level of the amplified WDM signal light from the EDF 36 becomes constant.

While the configuration shown in FIG. 4 adopts forward pumping such that the WDM signal light and the pump light propagate in the same direction in the EDF 36, the configuration may be modified to perform backward pumping such that the WDM signal light and the pump light propagate in opposite directions in the EDF 36. Alternatively, bidirectional pumping may be performed by using two pumping sources.

In the case that the wavelengths of the WDM signal light to be amplified are included in a 1.55 $\mu$m band (1.50 $\mu$m to 1.60 $\mu$m), a substantially flat gain band including the wavelengths of the WDM signal light can be provided by setting the wavelength of the pump light within a 0.98 $\mu$m band or a 1.48 $\mu$m band and properly setting a target value for AGC. Further, high-density wavelength division multiplexing can be achieved by sufficiently narrowing wavelength spacings.

While the EDF 36 is used as an optical amplifying medium in this optical amplifier, a doped fiber doped with another rare earth element, such as Yb or Nd, may also be used.

In the case of carrying out ALC for maintaining the total output level constant as shown in FIG. 4, there is a possibility that a change in number of channels of WDM signal light may cause a change in optical output power per channel to such an extent that the optical output power deviates from an allowable range of transmitted light output. This will now be described more specifically.

Figure 5:
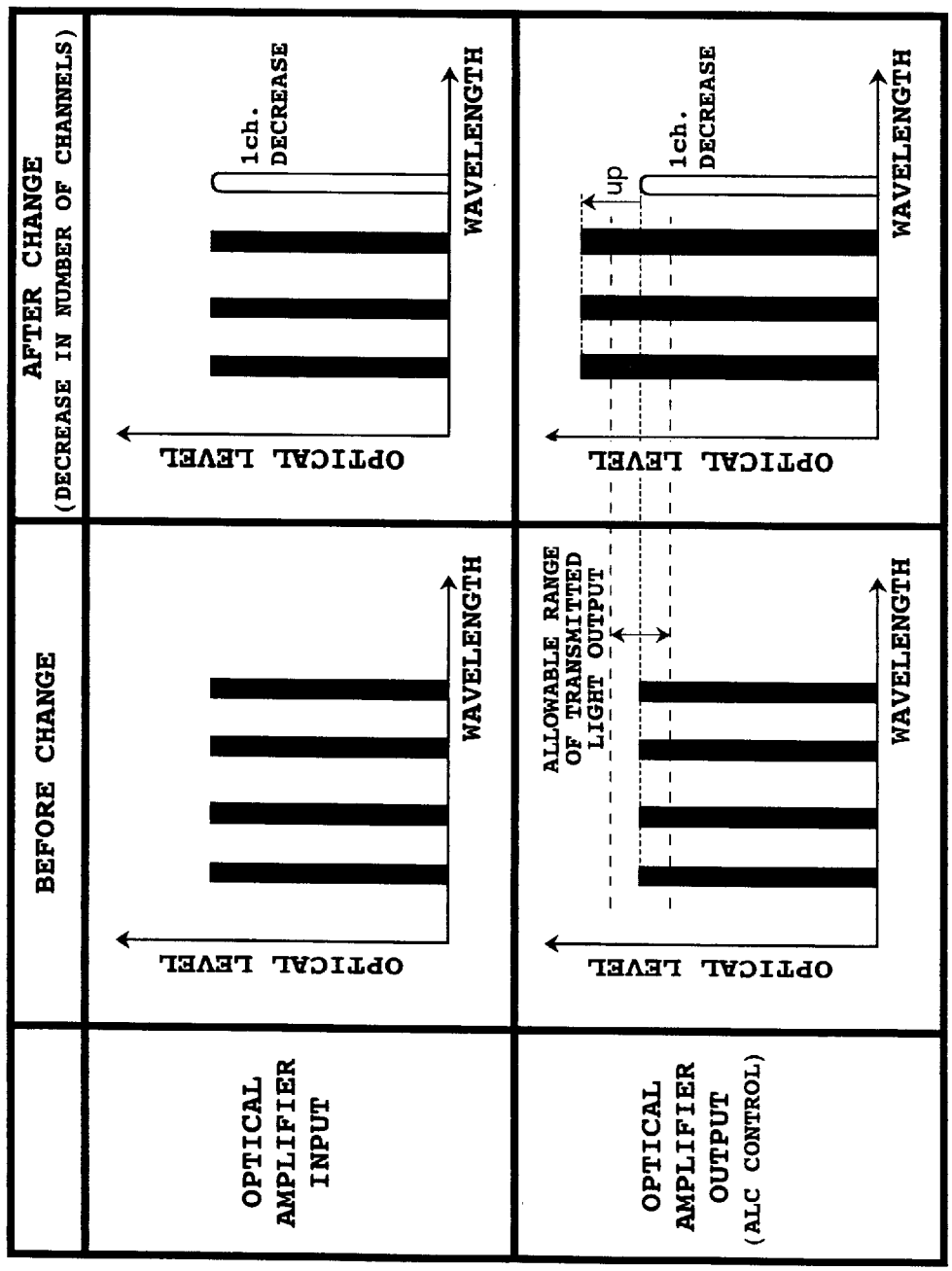
FIG. 5 is a graph for illustrating an increase in optical output power per channel due to a decrease in number of channels.

FIG. 5 is a graph for illustrating an increase in optical output power per channel due to a decrease in number of WDM channels. It is assumed that WDM signal light of four channels having a fixed input level is input into an optical amplifier as shown in a left upper portion of FIG. 5. In the case that an optical signal in one of the four channels is cut off as shown in a right upper portion of FIG. 5, an output spectrum corresponding to the input spectrum, as shown in a left lower portion of FIG. 5 changes into a spectrum shown in a right lower portion of FIG. 5. That is, the output level of the optical amplifier is controlled by ALC so that the total output level is maintained constant. Accordingly, when an optical signal in one channel is cut off, the output level in each of the remaining channels may exceed the upper limit of the allowable range of transmitted optical output. In this case, waveform distortion due to nonlinear effects may occur to cause a degradation in transmission quality.

Figure 6:
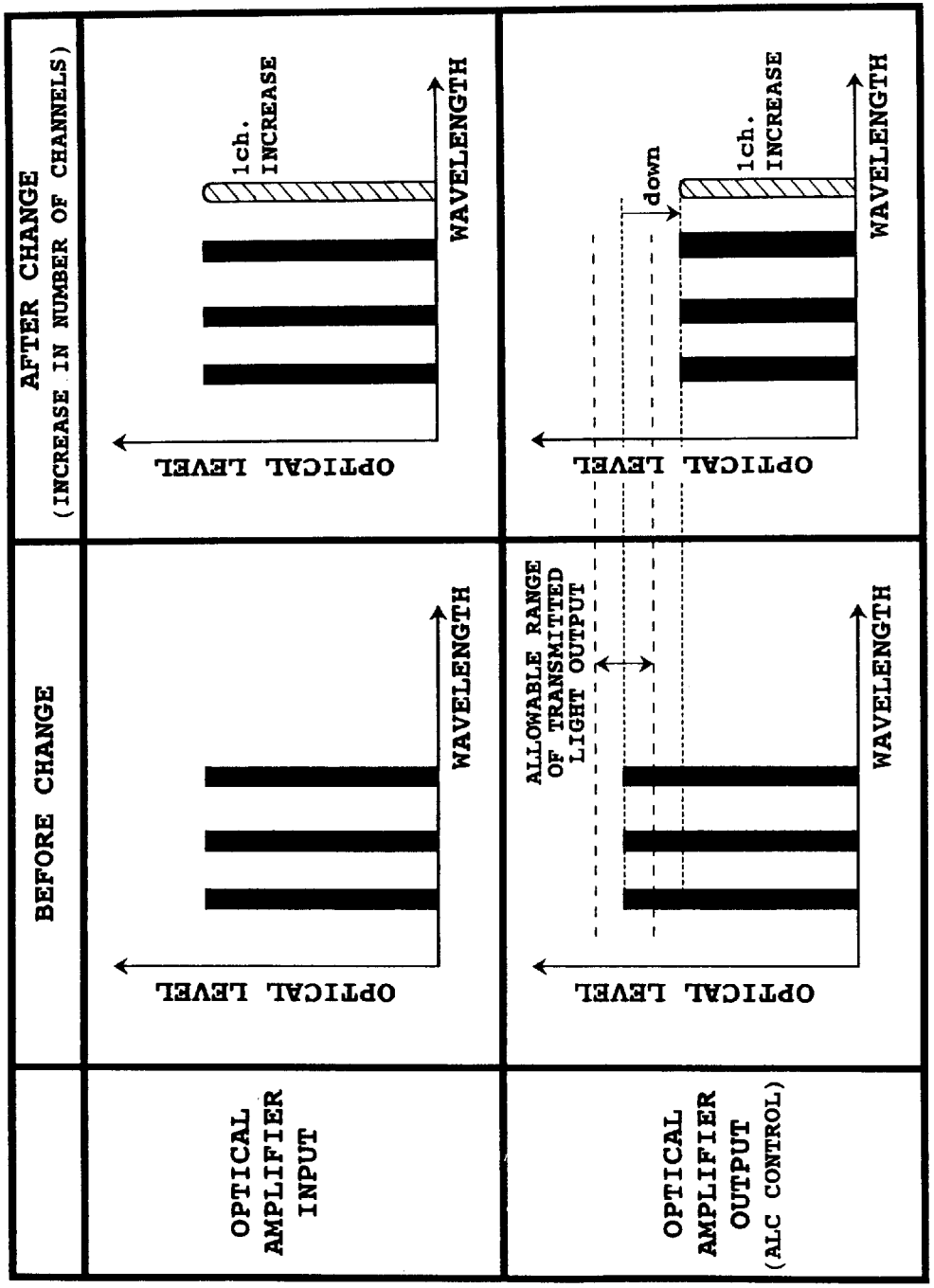
FIG. 6 is a graph for illustrating a decrease in optical output power per channel due to an increase in number of channels.

FIG. 6 is a graph for illustrating a decrease in optical output power per channel due to an increase in number of WDM channels. It is assumed that WDM signal light of three channels having a fixed level is input into an optical amplifier as shown in a left upper portion of FIG. 6. In the case that an optical signal in one channel is added as shown in a right upper portion of FIG. 6, an output spectrum corresponding to the input spectrum, as shown in a left lower portion of FIG. 6 changes into a spectrum shown in a right lower portion of FIG. 6. That is, ALC is performed to control the output level so that the total output level is maintained constant. Accordingly, when an optical signal in one channel is added, the output level in each channel may fall below the lower limit of the allowable range of transmitted light output. In this case, the optical power of the optical signal in each channel on the receiving side may become lower than a minimum received power, causing a deterioration in transmission quality.

There will now be described some preferred embodiments of the optical transmission device for eliminating the increase in optical output power per channel as described with reference to FIG. 5 or for eliminating the change in optical output power per channel as described with reference to FIGS. 5 and 6.

Figure 7:
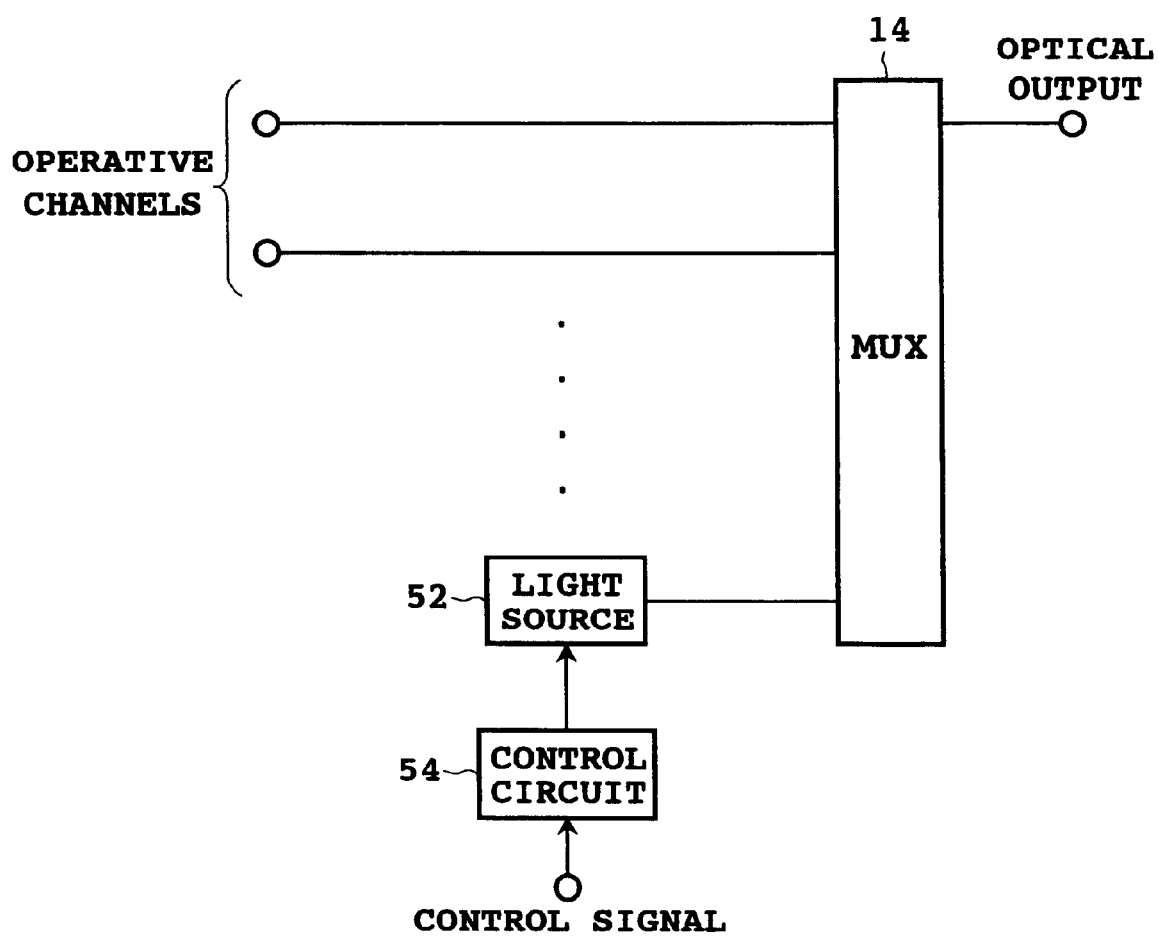
FIG. 7 is a block diagram showing a first preferred embodiment of the optical transmission device according to the present invention.

FIG. 7 is a block diagram showing a first preferred embodiment of the optical transmission device according to the present invention. In this preferred embodiment, the optical transmission device is applied to the first terminal station 2' shown in FIG. 2. In this preferred embodiment, the optical multiplexer 14 has a plurality of input ports respectively connected to the plural optical senders 8' (#1 to #n) for outputting optical signals having different wavelengths, and an additional one input port connected to an additional light source 52. The light source 52 is turned on or off by a control circuit 54 so as to output light having a predetermined wavelength in accordance with a predetermined rule. For example, when all the operative channels are in normal operation, the light source 52 is turned off, whereas when it is detected that an optical signal in one of the operative channels has been cut off, the light source 52 is turned on. Accordingly, in the case of carrying out ALC such that the total output power in each optical amplifier 16 shown in FIG. 2 becomes constant, the optical output power per channel in each optical amplifier 16 is prevented from being changed to thereby maintain a good transmission quality.

To minimize the change in optical output power per channel, it is preferable that the power of light output from the light source 52 be substantially equal to the power of the optical signal cut off and that the wavelength of light output from the light source 52 be included in the gain band of each optical amplifier 16.

The on/off operation of the light source 52 in accordance with the predetermined rule by the control circuit 54 is performed according to a control signal from a channel number monitor. Specific embodiments of the channel number monitor will be hereinafter described.

Further, it is preferable that the wavelength of light output from the light source 52 be different from the wavelength of the optical signal in each operative channel, so as to ensure a normal operation of each operative channel. For example, the wavelength of light output from the light source 52 is the same as the wavelength of the optical signal cut off or the same as a wavelength for an inoperative channel.

The light output from the light source 52 may be modulated light or unmodulated continuous wave light (CW light). In the case of modulating the light output from the light source 52 by a modulating signal, information on the channel cut off can be transmitted to each optical amplifier 16 or to the second terminal station 4' by the modulating signal.

In the preferred embodiment shown in FIG. 7, the light source 52 is dedicated for compensation such that the total power of WDM signal light to be obtained becomes substantially constant. Alternatively, any one of the optical senders 8' (#1 to #n) in an inoperative channel may be used in place of the light source 52.

While the single light source 52 is used in the preferred embodiment shown in FIG. 7, a plurality of light sources may be used to cope with breaking of plural channels.

Figure 8:
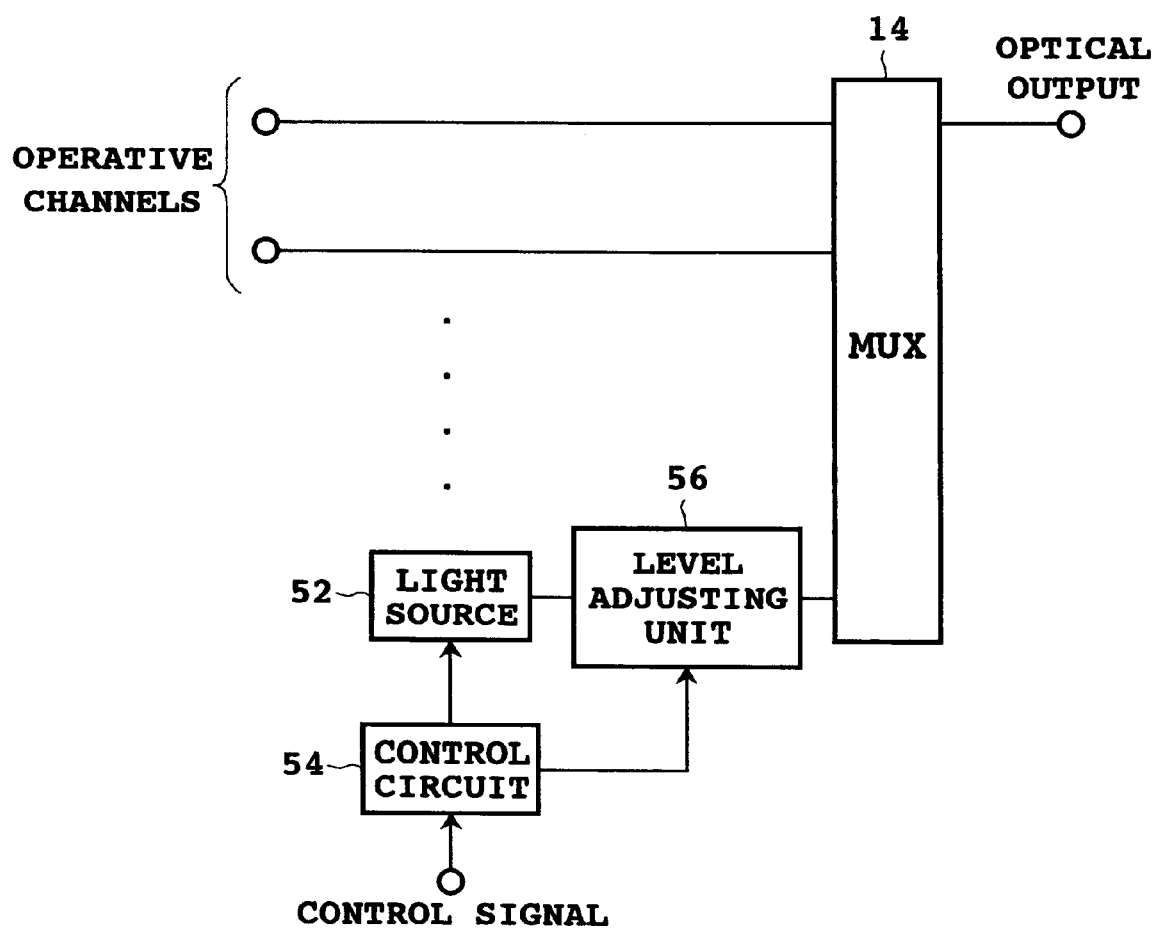
FIG. 8 is a block diagram showing a second preferred embodiment of the optical transmission device according to the present invention.

FIG. 8 is a block diagram showing a second preferred embodiment of the optical transmission device according to the present invention. In contrast with the first preferred embodiment shown in FIG. 7, the second preferred embodiment further includes a level adjusting unit 56 between the light source 52 and an input port of the optical multiplexer 14. The level adjusting unit 56 is provided by an optical attenuator having a variable attenuation or an optical amplifier having a variable gain. The number of WDM channels cut off can be detected according to a control signal to be supplied to the control circuit 54. Accordingly, by adjusting the level adjusting unit 56 according to the result of the above detection, the total power of WDM signal light can be maintained constant irrespective of the number of channels cut off, and the optical output power per channel is prevented from exceeding an allowable range of transmitted light output. While the level adjusting unit 56 is provided independently of the light source 52 in this preferred embodiment, a laser diode capable of outputting light having a controlled power according to a drive current may be used as the light source 52, and the drive current may be adjusted to thereby control the power of the light to be added to the WDM signal light.

Figure 9:
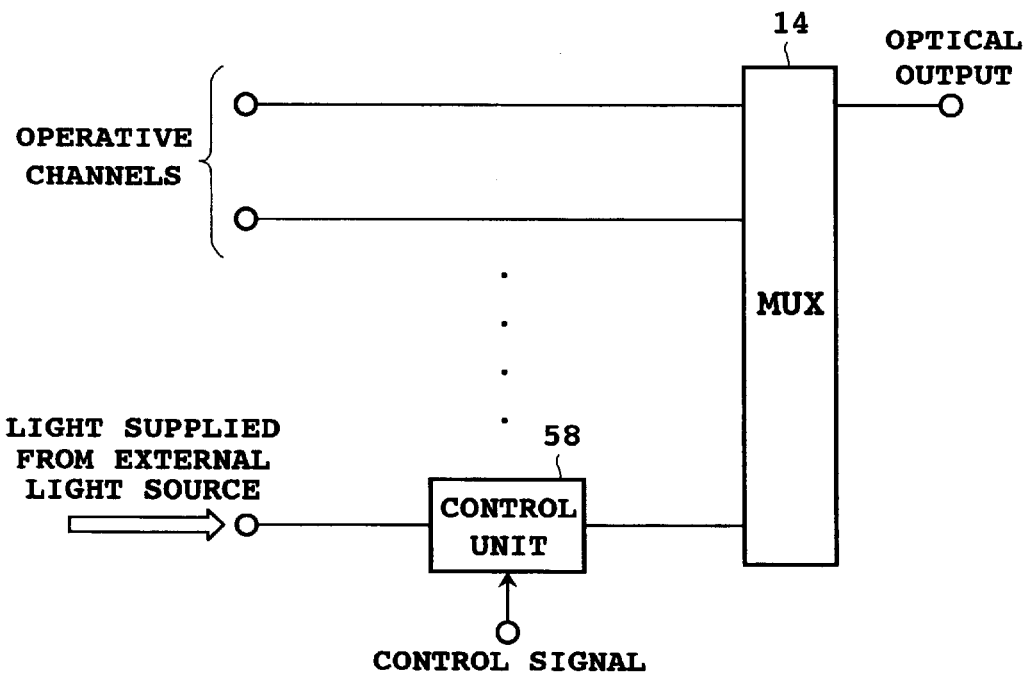
FIG. 9 is a block diagram showing a third preferred embodiment of the optical transmission device according to the present invention.

FIG. 9 is a block diagram showing a third preferred embodiment of the optical transmission device according to the present invention. In this preferred embodiment, any light source dedicated for compensation such that the total power of WDM signal light to be obtained becomes constant is not used, but a control unit 58 is used to switch on or off light supplied from an external light source and add the external light to the WDM signal light in the optical multiplexer 14. More specifically, when the operative channels are in normal operation, the external light is switched off by the control unit 58, whereas when any one of the operative channels is cut off, the external light is switched on by the control unit 58 and added to the WDM signal light. Accordingly, the total output power of the WDM signal light to be obtained can be maintained always constant, and the optical output power per channel can be made fall within an allowable range of transmitted light output. As a result, there is no possibility of degradation in transmission quality in the case that the number of WDM channels is changed.

While the control unit 58 switches on or off the external light in this preferred embodiment, the control unit 58 may be modified to adjust the power of the external light and add the external light to the WDM signal light on the basis of the level adjusting unit 56 in the second preferred embodiment shown in FIG. 8. By applying such level adjustment to at least one channel, the total output power of WDM signal light can be maintained constant even when optical signals in plural channels are cut off. Further, even in the case that the level adjustment is not carried out, it is possible to cope with breaking of plural channels by applying the compensating means according to the present invention to plural channels, preferably, all the channels.

While the optical transmission device is applied to the first terminal station 2' of the system shown in FIG. 2 in each of the first to third preferred embodiments, the device may be applied to the first terminal station 2 of the system shown in FIG. 1. In this case, the wavelength converters 12 (#1 to #n) and another necessary wavelength converter are provided on the input side of the optical multiplexer 14.

Figure 10:
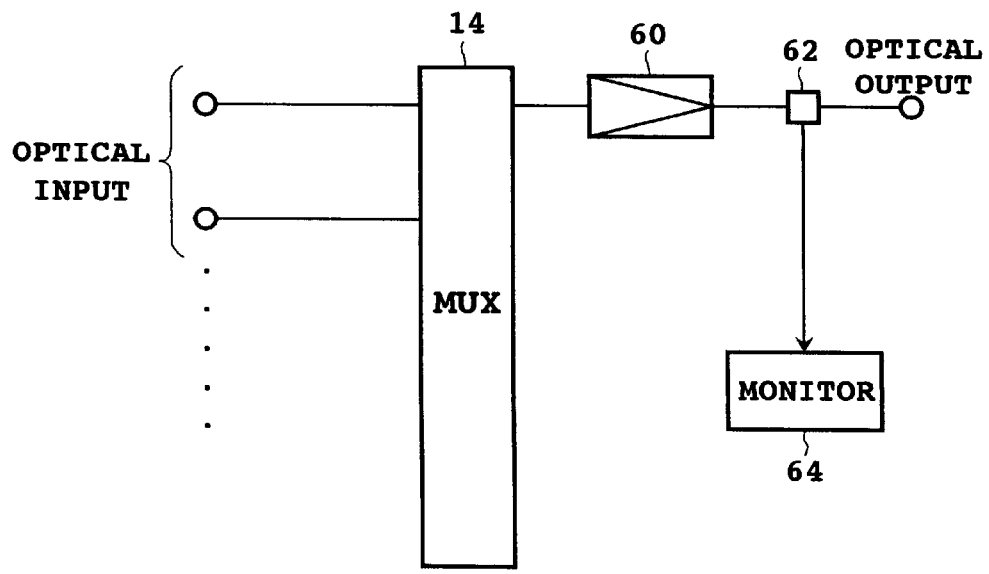
FIG. 10 is a block diagram showing a preferred embodiment of a channel number monitor applicable to the present invention.

FIG. 10 is a block diagram showing a preferred embodiment of the channel number monitor for monitoring the number of WDM channels cut off. A postamplifier 60 for amplifying WDM signal light is provided at the output port of the optical multiplexer 14. The WDM signal light amplified by the postamplifier 60 is branched by an optical coupler 62, and resultant branch light is supplied to a channel number monitor 64. The channel number monitor 64 performs monitoring on the number of WDM channels cut off or the like according to the input branch light. The result of monitoring is output as the above-mentioned control signal.

According to this preferred embodiment, the monitoring is performed on the output side of the optical multiplexer 14. Accordingly, it is possible to detect a signal break due to device failure, connector separation, package separation, etc. both on the input side and on the output side of the optical multiplexer 14. Further, since the WDM signal light obtained after wavelength division multiplexing is supplied to the channel number monitor 64, a signal break per channel can be detected by using a spectrum analyzer in the monitor 64.

Figure 11:
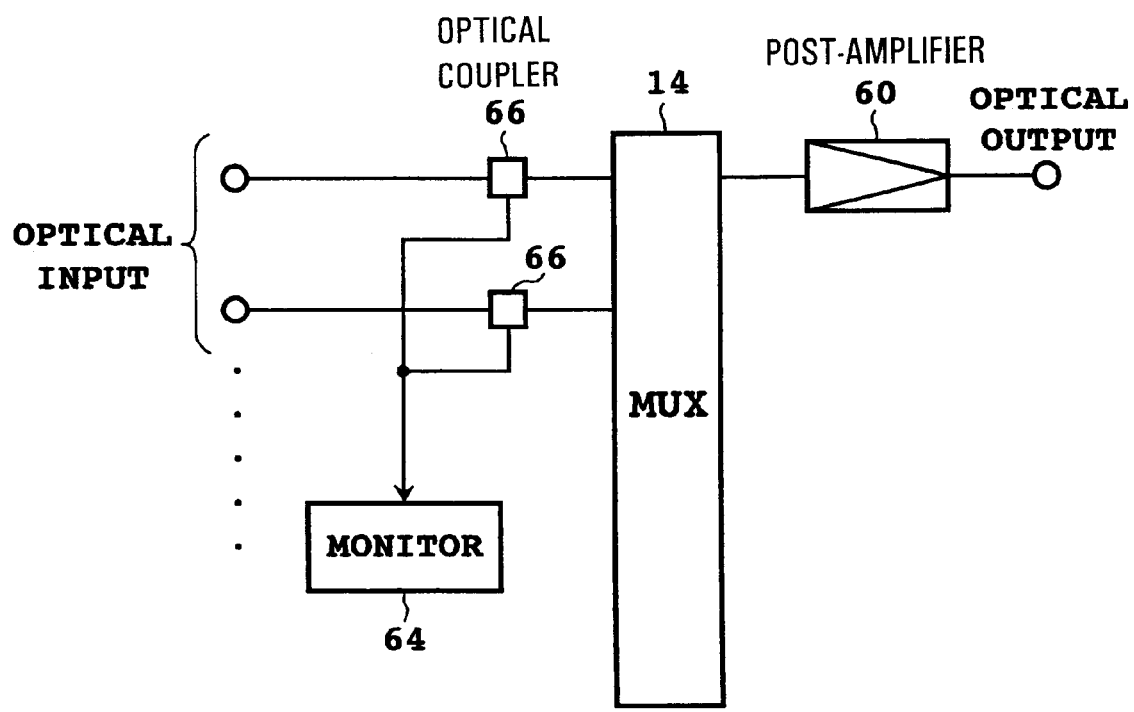
FIG. 11 is a block diagram showing another preferred embodiment of the channel number monitor applicable to the present invention.

FIG. 11 is a block diagram showing another preferred embodiment of the channel number monitor applicable to the present invention. In this preferred embodiment, an optical coupler 66 is provided at each input port of the optical multiplexer 14 to branch an optical signal in each channel. A resultant branch optical signal is supplied directly to a channel number monitor 64.

According to this preferred embodiment, the optical signals before wavelength division multiplexing are supplied directly to the monitor 64. Accordingly, a signal break in a specific channel can be quickly detected without use of a spectrum analyzer. Further, a circuit configuration from break detection to control can be simplified, thereby achieving a high response speed.

Figure 12:
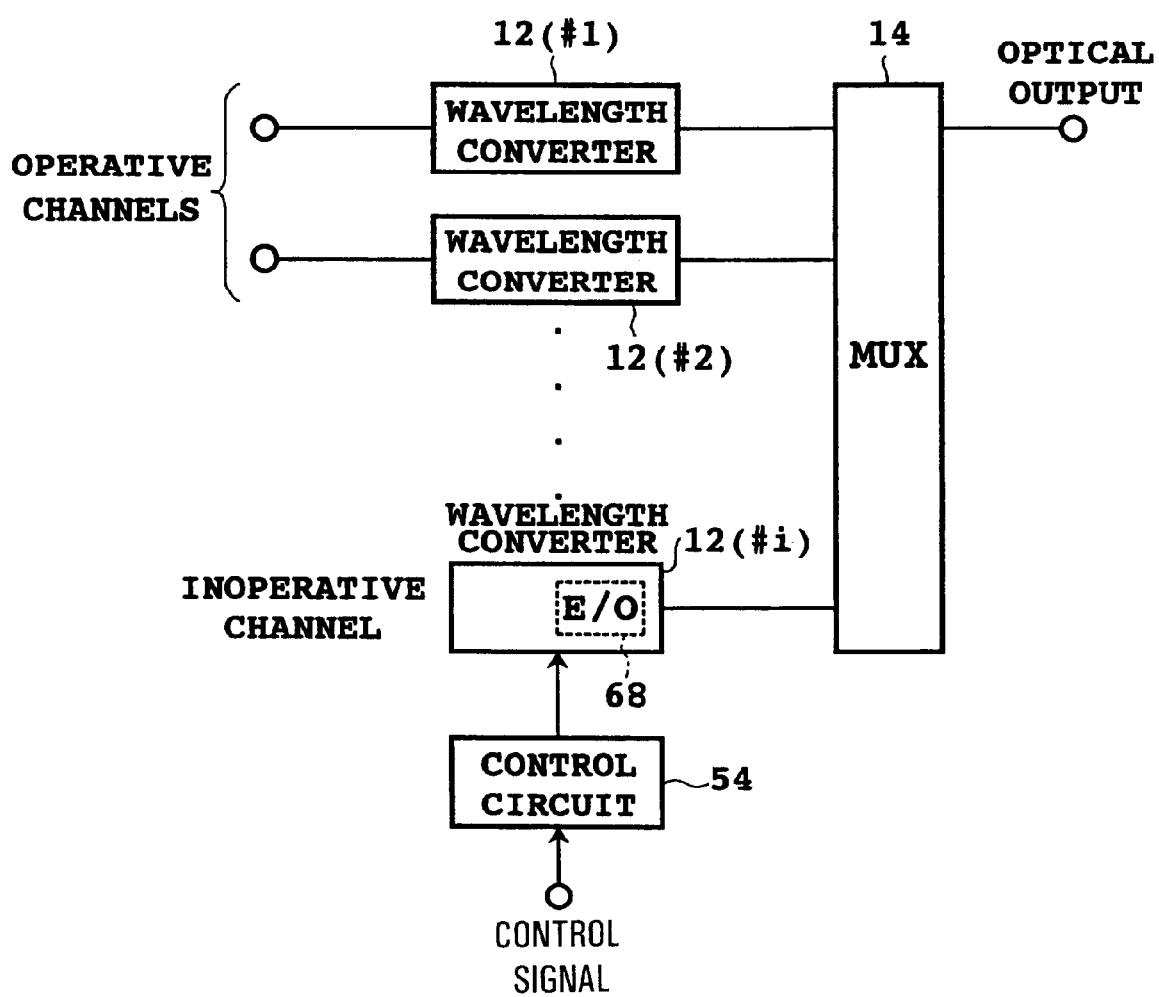
FIG. 12 is a block diagram showing a fourth preferred embodiment of the optical transmission device according to the present invention.

FIG. 12 is a block diagram showing a fourth preferred embodiment of the optical transmission device according to the present invention. In this preferred embodiment, the optical transmission device is applied to the first terminal station 2 of the system shown in FIG. 1. In this preferred embodiment, an E/O converter (electro/optical converter) 68 included in a wavelength converter 12 (#i) in an inoperative channel, of the plural wavelength converters 12 (#1 to #n) included in the transponder 10 is switched on or off by a control circuit 54. Alternatively, an E/O converter in a wavelength converter in any channel where an input optical signal is cut off rather than the E/O converter 68 in the inoperative channel may be switched on or off by the control circuit 54.

According to this preferred embodiment, the compensation such that the total power of WDM signal light to be obtained becomes constant can be performed by using the E/O converter in the existing wavelength converter, thereby achieving the object of the present invention with a simple configuration.

While the detection of breaking of an optical signal in a certain one of the WDM channels can be performed by using the channel number monitor 64 shown in FIG. 10 or 11, the breaking of an optical signal may be detected by the following configurations.

Figure 13A:
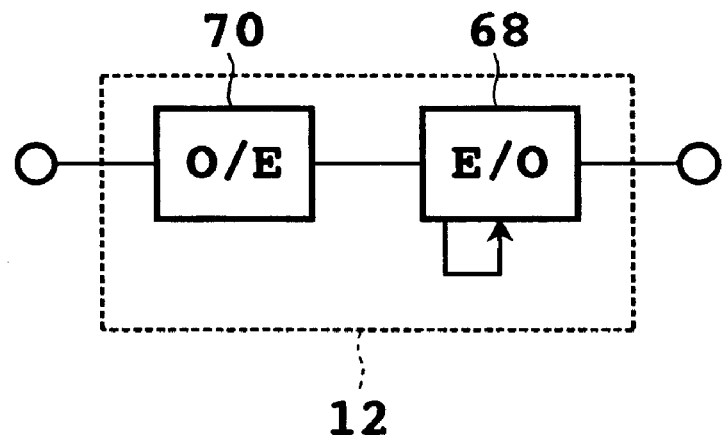
FIGS. 13A and 13B are block diagrams showing preferred embodiments of a wavelength converter applicable to the present invention.
Figure 13B:
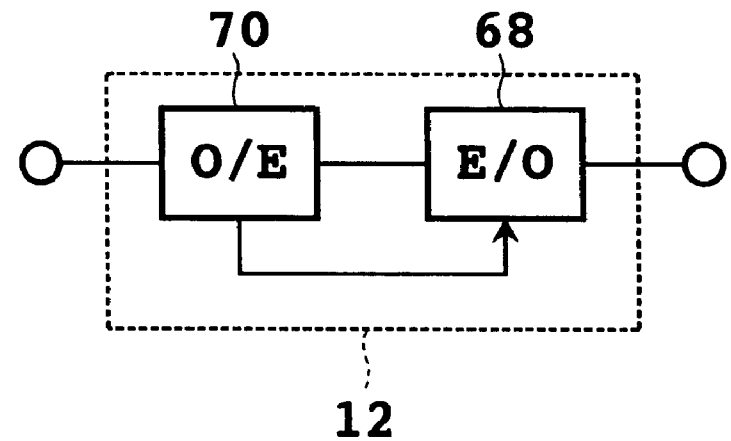

FIGS. 13A and 13B show preferred embodiments of the wavelength converter for the detection of a signal break. In the preferred embodiment shown in FIG. 13A, the wavelength converter 12 includes an O/E converter (opto/electrical converter) 70 for converting an original optical signal supplied into an electrical signal and an E/O converter 68 for converting the electrical signal output from the O/E converter 70 into an optical signal. When a signal break is detected in the E/O converter 68, the E/O converter 68 immediately emits steady light. That is, both the detection of a signal break and the output of compensating light are completed in the E/O converter 68. In the preferred embodiment shown in FIG. 13B, a break of input of an optical signal is detected in the O/E converter 70. When a signal break is detected according to the result of detection in the O/E converter 70, the E/O converter 68 emits steady light. According to the preferred embodiment shown in FIG. 13A or 13B, the configuration of the existing wavelength converter can be used without any changes, so that the compensation can be performed with a simple configuration at a high response speed.

In the case that ALC for maintaining the total output level in each optical amplifier 16 constant is carried out in each of the systems shown in FIGS. 1 and 2, the range of variation in optical output level per channel due to a signal break is dependent on the number of operative channels. For example, as shown in Table 1 below, when the number of operative channels changes from 2 to 1, an optical output level of 3.01 dB is increased. In contrast therewith, when the number of operative changes from 8 to 7, a change in optical output as small as 0.58 dB.

TABLE 1

| Number of channels before change | Number of channels after change | Change in optical output power |
| --- | --- | --- |
| 2 | 1 | 3.01 dB/ch. up |
| 3 | 2 | 1.76 dB/ch. up |
| 4 | 3 | 1.25 dB/ch. up |
| 5 | 4 | 0.97 dB/ch. up |
| 6 | 5 | 0.79 dB/ch. up |
| 7 | 6 | 0.67 dB/ch. up |
| 8 | 7 | 0.58 dB/ch. up |

Accordingly, in the case that a part of the plural optical senders 8 (#1 to #n) in the system shown in FIG. 1 is used for signal transmission, or in the case that a part of the plural optical senders 8' (#1 to #n) in the system shown in FIG. 2 is used for signal transmission, a part or the whole of the remaining optical senders is preferably operated to emit steady light, thereby reducing the range of variation in optical output level per channel in the case of a signal break in any operative channel.

To reduce the range of variation in optical output level per channel, a dedicated light source rather than the optical sender in an inoperative channel may be used. This will be described with reference to FIG. 14.

Figure 14:
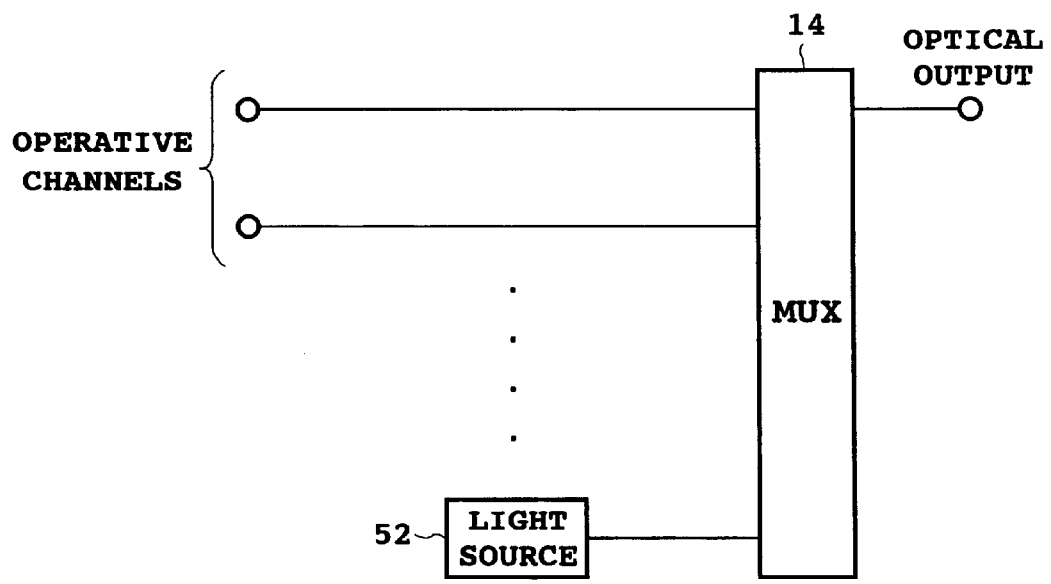
FIG. 14 is a block diagram showing a fifth preferred embodiment of the optical transmission device according to the present invention.

FIG. 14 is a block diagram showing a fifth preferred embodiment of the optical transmission device according to the present invention. In this preferred embodiment, a light source 52 is connected to one of the input ports of the optical multiplexer 14. The light source 52 outputs light having a predetermined wavelength. The light output from the light source 52 is added to WDM signal light in the optical multiplexer 14. The wavelength of the light output from the light source 52 is included in the gain band of each optical amplifier 16, and set different from the wavelength of an optical signal in each operative channel. While the single light source 52 is shown in FIG. 14, a plurality of light sources may be used. To minimize the range of variation in optical output level per channel, the number of light sources 52 is preferably increased.

Figure 15:
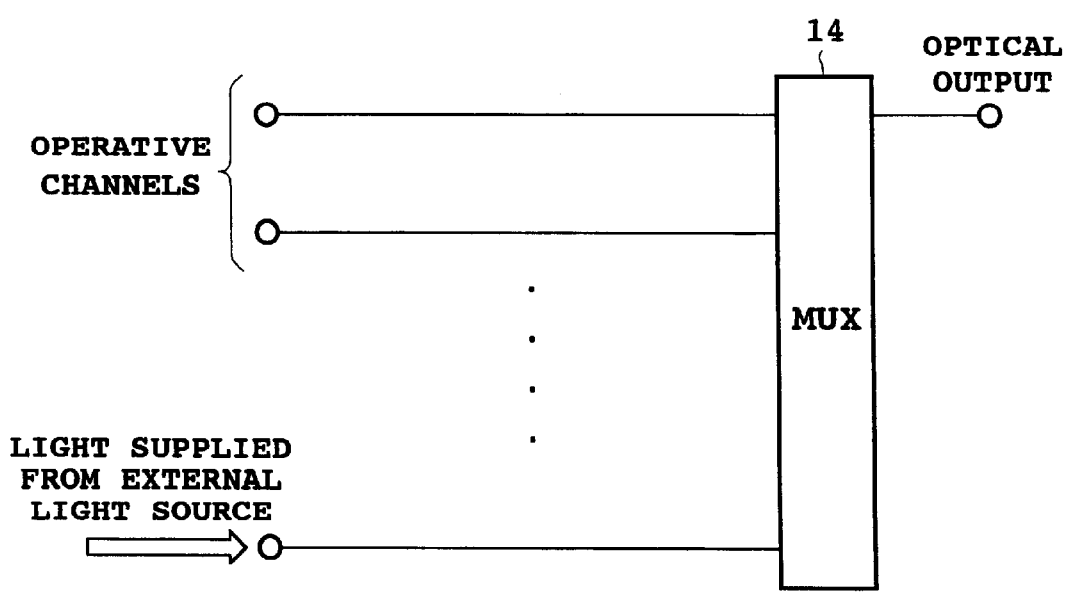
FIG. 15 is a block diagram showing a sixth preferred embodiment of the optical transmission device according to the present invention.

FIG. 15 is a block diagram showing a sixth preferred embodiment of the optical transmission device according to the present invention. In this preferred embodiment, light supplied from an external light source is added to WDM signal light in the optical multiplexer 14, so as to reduce the range of variation in optical output level per channel.

The optical transmission device shown in each of FIGS. 14 and 15 is applicable to the first terminal station 2' in the system in FIG. 2, and applicable also to the input side of the wavelength converters 12 (#1 to #n) in the system shown in FIG. 1.

In the preferred embodiment shown in FIG. 14, the power of the light output from the light source 52 may be constant or may be adjustable by use of the level adjusting unit 56 shown in FIG. 8.

Further, in the preferred embodiment shown in FIG. 15, the control unit 58 shown in FIG. 9 may be applied to thereby make the power of the external light adjustable.

Figure 16:
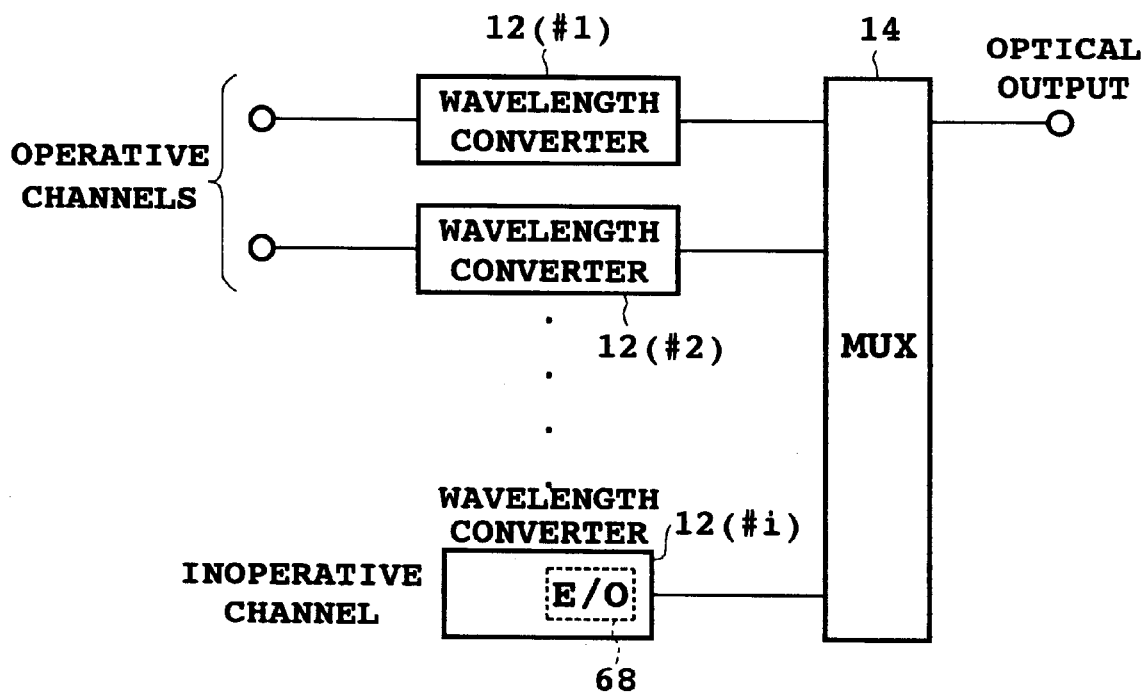
FIG. 16 is a block diagram showing a seventh preferred embodiment of the optical transmission device according to the present invention.

FIG. 16 is a block diagram showing a seventh preferred embodiment of the optical transmission device according to the present invention. In this preferred embodiment, a wavelength converter 12 (#i) in an inoperative channel is used to operate its E/O converter 68 to emit steady light like the preferred embodiment shown in FIG. 12. According also to this preferred embodiment, the range of variation in optical output level per channel can be reduced in the case of a signal break in any operative channel in accordance with the principles described above with reference to Table 1.

In carrying out the present invention, the power of the compensating light is preferably controlled so that the output level of each optical amplifier per channel becomes constant.

As described above, according to the present invention, it is possible to provide an optical transmission device and an optical communication system which can eliminate the possibility of deterioration in transmission quality in the case that the number of wavelength division multiplexed (WDM) channels is changed.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical transmission device comprising:
   an optical multiplexer for wavelength division multiplexing a plurality of optical signals to generate WDM signal light and outputting said WDM signal light to an optical transmission line;
   a detector to detect stoppage of any of said plurality of optical signals, the stoppage being detected based on the power of the optical signal; and
   a compensator to add light having a predetermined wavelength to said WDM signal light when at least one of said plurality of optical signals stops.

2. An optical transmission device according to claim 1, further comprising a plurality of optical senders for outputting said plurality of optical signals, respectively.

3. An optical transmission device according to claim 1, further comprising a light source for outputting said light having the predetermined wavelength, wherein said compensator comprises a switch to turn on/off said light source.

4. An optical transmission device according to claim 1, wherein said compensator comprises a switch to turn on/off light supplied from an external light source.

5. An optical transmission device according to claim 1, further comprising:
   a plurality of optical senders for outputting a plurality of original optical signals, respectively; and
   a plurality of wavelength converters for wavelength converting said plurality of original optical signals into said plurality of optical signals, respectively.

6. An optical transmission device according to claim 5, wherein:
   each of said plurality of wavelength converters comprises an O/E converter for converting the corresponding original optical signal into an electrical signal, and an E/O converter for converting said electrical signal into the corresponding optical signal; and
   said compensator comprises a switch to turn on said E/O converter in any inoperative converter.

7. An optical transmission device according to claim 1, further comprising an adjustment device to adjust the power of said light having the predetermined wavelength.

8. An optical communication system comprising:
   an optical fiber transmission line;
   an optical multiplexer for wavelength division multiplexing a plurality of optical signals to generate WDM signal light and outputting said WDM signal light to said optical fiber transmission line;
   a detector to detect stoppage of any of said plurality of optical signals, the stoppage being detected based on the power of the optical signal; and
   compensator to add light having a predetermined wavelength to said WDM signal light when at least one of said plurality of optical signals stops.

9. An optical communication system according to claim 8, further comprising at least one optical amplifier provided in said optical fiber transmission line for amplifying said WDM signal light.

10. An optical communication system according to claim 9, wherein said optical amplifier includes a feedback loop for performing control such that an overall output level from said optical amplifier is maintained constant.

11. An optical communication system according to claim 10, further comprising an adjustment device to adjust the power of said light having the predetermined wavelength so that individual output levels from said optical amplifier for each channel are maintained constant.

12. An optical communication system according to claim 9, wherein:
   said optical amplifier comprises an optical amplifying medium and a pumping light source to pump said optical amplifying medium so that said optical amplifying medium provides a gain band including the wavelengths of said WDM signal light;
   said predetermined wavelength being included in said gain band.

13. An optical communication system according to claim 12, wherein:
   said optical amplifying medium comprises a doped fiber doped with a rare earth element; and
   said pumping light source supplies pump light to said doped fiber.

14. An optical transmission device comprising:
   a plurality of optical senders to respectively output a plurality of optical signals having different wavelengths;
   an optical multiplexer to wavelength division multiplex said plurality of optical signals to generate WDM signal light and output said WDM signal light to an optical transmission line;
   a detector to detect stoppage of one or more of the optical signals; and at least one light source to add light having a predetermined wavelength to said WDM signal light when the detector detects that one or more of the optical signals has stopped.

15. An optical transmission device according to claim 14, further comprising an adjustment device to adjust the power of said light having the predetermined wavelength.

16. An optical communication system comprising:

an optical fiber transmission line;

a plurality of optical senders to respectively output a plurality of optical signals having different wavelengths;

an optical multiplexer to wavelength division multiplex said plurality of optical signals to generate WDM signal light and output said WDM signal light to said optical fiber transmission line;

a detector to detect stoppage of one or more of the optical signals; and at least one light source to add light having a predetermined wavelength to said WDM signal light when the detector detects that one or more of the optical signals has stopped.

17. An optical communication system according to claim 16, further comprising at least one optical amplifier provided in said optical fiber transmission line for amplifying said WDM signal light.

18. An optical communication system according to claim 17, wherein:

said optical amplifier comprises an optical amplifying medium and a pumping light source to pump said optical amplifying medium so that said optical amplifying medium provides a gain band including the wavelengths of said WDM signal light;

said predetermined wavelength being included in said gain band.

19. An optical communication system according to claim 18, wherein:

said optical amplifying medium comprises a doped fiber doped with a rare earth element; and said pumping light source supplies pump light to said doped fiber.

20. An optical communication system comprising:

an optical fiber transmission line;

a plurality of optical senders to respectively output a plurality of optical signals having different wavelengths;

an optical multiplexer to wavelength division multiplex said plurality of optical signals to generate WDM signal light and output said WDM signal light to said optical fiber transmission line;

at least one light source to add light having a predetermined wavelength to said WDM signal light; and at least one optical amplifier provided in said optical fiber transmission line for amplifying said WDM signal light, said optical amplifier including a feedback loop for performing control such that an overall output level from said optical amplifier is maintained constant.

21. An optical communication system according to claim 20, further comprising an adjustment device to adjust the power of said light having the predetermined wavelength so that individual output levels from said optical amplifier for each channel are maintained constant.

22. An optical device comprising:

an optical multiplexer for wavelength division multiplexing a plurality of optical signals;

a signal detector to detect the absence of one or more of the optical signals; and an optical signal source to produce an optical dummy signal and combine the optical dummy signal with the plurality of optical signals when the signal detector detects an absence of one or more of the optical signals.

* * * * *

UNITED STATES PATENT AND TRADEMARK OFFICE
CERTIFICATE OF CORRECTION

PATENT NO.    : 6,449,074 B1                                          Page 1 of 1
DATED         : September 10, 2002
INVENTOR(S)   : Satoru Okano et al.

It is certified that error appears in the above-identified patent and that said Letters Patent is hereby corrected as shown below:

<u>Title page,</u>
Item [56], References Cited, insert the following:
-- FOREIGN PATENT DOCUMENTS
08 125636 5/1996 Japan --

Signed and Sealed this

Twenty-fourth Day of February, 2004

JON W. DUDAS
*Acting Director of the United States Patent and Trademark Office*